US008419979B2

(12) United States Patent
Kim et al.

(10) Patent No.: US 8,419,979 B2
(45) Date of Patent: Apr. 16, 2013

(54) THERMOPLASTIC RESIN COMPOSITION HAVING ELECTRICAL CONDUCTIVITY, WEAR RESISTANCE AND HIGH HEAT RESISTANCE

(75) Inventors: Sang Wan Kim, Uiwang-si (KR); Sun Ho Park, Uiwang-si (KR); Young Kyu Chang, Uiwang-si (KR); Young Sil Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 244 days.

(21) Appl. No.: 13/030,364

(22) Filed: Feb. 18, 2011

(65) Prior Publication Data

US 2011/0147640 A1 Jun. 23, 2011

Related U.S. Application Data

(63) Continuation-in-part of application No. PCT/KR2008/007812, filed on Dec. 30, 2008.

(30) Foreign Application Priority Data

Aug. 19, 2008 (KR) ........................ 10-2008-0080925

(51) Int. Cl.

| | |
|---|---|
| ***H01B 1/24*** | (2006.01) |
| ***H01B 1/12*** | (2006.01) |
| ***B29C 47/00*** | (2006.01) |
| ***C08F 283/00*** | (2006.01) |

(52) U.S. Cl.

USPC ..................... 252/511; 252/519.33; 428/36.9; 525/537

(58) Field of Classification Search .................. 252/511, 252/519.33; 428/36.9; 525/537

See application file for complete search history.

(56) References Cited

U.S. PATENT DOCUMENTS

| | | | |
|---|---|---|---|
| 6,245,845 B1 | 6/2001 | Miyamori et al. | |
| 2004/0016912 A1 | 1/2004 | Bandyopadhyay et al. | |
| 2005/0067406 A1 | 3/2005 | Rajarajan et al. | |
| 2005/0070658 A1 | 3/2005 | Ghosh et al. | |
| 2006/0108567 A1 | 5/2006 | Charati et al. | |
| 2006/0155032 A1 | 7/2006 | Mizubuchi et al. | |
| 2009/0041968 A1 * | 2/2009 | Saitoh et al. | 428/36.9 |
| 2012/0251020 A1 * | 10/2012 | Swei | 384/13 |

FOREIGN PATENT DOCUMENTS

| | | |
|---|---|---|
| JP | 04-007360 A | 1/1992 |
| JP | 08-337720 A | 12/1996 |
| JP | 11-286588 A | 10/1999 |
| JP | 12-143921 A | 5/2000 |
| JP | 18-143827 A | 6/2006 |
| KR | 10-2005-0086932 A | 8/2005 |
| WO | 2004/040590 A2 | 5/2004 |
| WO | 2005/034145 A1 | 4/2005 |
| WO | WO 2007108384 A1 * | 9/2007 |
| WO | 2010/021437 A1 | 2/2010 |

OTHER PUBLICATIONS

International Search Report in counterpart International Application No. PCT/KR2008/007812 dated Aug. 18, 2009, pp. 1-4.

* cited by examiner

*Primary Examiner* — Mark Kopec
*Assistant Examiner* — Jaison Thomas
(74) *Attorney, Agent, or Firm* — Summa, Additon & Ashe, P.A.

(57) ABSTRACT

The thermoplastic resin composition of present invention comprises (A) about 50 to about 90% by weight polyphenylene sulfide resin; (B) about 5 to about 30% by weight graphite; (C) about 5 to about 30% by weight fluoropolyolefin resin; (D) about 1 to about 10% by weight whiskers; and (E) about 0.01 to about 10% by weight carbon nanotubes. The thermoplastic resin composition can exhibit electrical conductivity, wear resistance and heat resistance.

16 Claims, No Drawings

THERMOPLASTIC RESIN COMPOSITION HAVING ELECTRICAL CONDUCTIVITY, WEAR RESISTANCE AND HIGH HEAT RESISTANCE

CROSS-REFERENCE TO RELATED APPLICATIONS

This application is a continuation-in-part of International Application No. PCT/KR2008/007812, filed Dec. 30, 2008, pending, which designates the U.S., published as WO 2010/021437, and is incorporated herein by reference in its entirety, and claims priority therefrom under 35 USC Section 120. This application also claims priority under 35 USC Section 119 from Korean Patent Application No. 10-2008-0080925, filed Aug. 19, 2008, in the Korean Intellectual Property Office, the entire disclosure of which is also incorporated herein by reference.

FIELD OF THE INVENTION

The present invention relates to a thermoplastic resin composition that can have a balance of electrical conductivity, wear resistance and high heat resistance physical properties.

BACKGROUND OF THE INVENTION

Thermoplastic resins are resins which exhibit plasticity when heated and turn solid when cooled. Thermoplastic resins are typically classified as 'ordinary plastic' such as polyethylene resin, polypropylene resin, acrylic resin, styrene resin and vinyl resin and 'engineering plastic' such as polycarbonate resin, polyphenylene ether resin, polyamide resin, polyester resin and polyimide resin.

Thermoplastic resins have excellent processability and moldability so that they have been widely used in various products for day-to-day life, office automation machinery and electric and electronic goods. In addition, there have been many attempts to impart special properties to thermoplastic resins based on the kinds and qualities of the targeted final products, which can increase their value.

For example, when the thermoplastic resin is used in a technical field where surface friction between resin products or with other materials is strong, the thermoplastic resin should have electric conductivity and wear resistance to prevent the generation of electric charge and to prevent damage or contamination of products due to resin abrasion.

Various additives can be added to a thermoplastic resin to improve a specific property thereof, such as electric conductivity or wear resistance. Such additives, however, can be limited with respect to their ability to improve multiple different properties, and thus are conventionally used to improve only one physical property of a thermoplastic resin.

SUMMARY OF THE INVENTION

The present invention provides a thermoplastic resin composition that can exhibit an improvement in various different properties, such as improved electrical conductivity, wear resistance and/or high heat resistance. The thermoplastic resin composition of the invention can accordingly be used to manufacture various kinds of plastic products like precision machine parts, components of electric and electronic goods, and automobile precision parts cables, among others. As a non-limiting example, a printer bushing can be made using the thermoplastic resin composition of the invention.

Other aspects, features and advantages of the present invention will be apparent from the ensuing disclosure and appended claims.

The thermoplastic resin composition of the invention comprises polyphenylene sulfide resin, graphite, fluoropolyolefin resin, whiskers and carbon nanotubes. In exemplary embodiments, the composition comprises (A) about 50 to about 90% by weight polyphenylene sulfide resin; (B) about 5 to about 30% by weight graphite; (C) about 5 to about 30% by weight fluoropolyolefin resin; (D) about 1 to about 10% by weight whiskers; and (E) about 0.01 to about 10% by weight carbon nanotubes.

The polyphenylene sulfide resin (A) may have an average molecular weight of about 3,000 to about 50,000 g/mol.

The graphite (B) can have a particle size of about 0.5 to about 300 μm. In an exemplary embodiment, the graphite (B) may be surface-treated by an alkaline earth metal compound, silane coupling reagent, titanium coupling reagent, aluminum containing coupling reagent, or a combination thereof.

The fluoropolyolefin resin (C) can have a particle size of about 3 to about 50 μm and a specific gravity of about 1.2 to about 2.3 g/cm$^3$.

The whiskers (D) can have an average diameter of about 0.15 to about 10 μm and an average length of about 2 to about 100 μm. In exemplary embodiments, the whiskers can include zinc oxide whiskers, calcium carbonate whiskers, titanium dioxide whiskers, silicon dioxide whiskers, silicon carbide whiskers, aluminum borate whiskers, magnesium borate whiskers, potassium titanate whiskers, silicon nitride whiskers, silicon carbide whiskers, aluminum oxide whiskers, and combinations thereof. In an exemplary embodiment, the whiskers (D) include calcium carbonate ($CaCO_3$) whiskers. In another exemplary embodiment, the whiskers (D) may be coated with a conductive material such as silver, copper, aluminum, iron, palladium, tin oxide, indium oxide, silicon carbide, zirconium carbide, titanium carbide, graphite and combinations thereof.

The carbon nanotubes (E) may comprise single-walled carbon nanotubes, double-walled carbon nanotubes, multi-walled carbon nanotubes or a combination thereof. In an exemplary embodiment, the carbon nanotubes (E) can have an average diameter of about 0.5 to about 100 nm and an average length of about 0.01 to about 100 μm.

The resin composition may further include an additive. Exemplary additives can include without limitation flame retardant, antimicrobial agent, mold release agent, heat stabilizer, antioxidant agent, light stabilizer, compatibilizing agent, dye, pigment, coupling agent, charging material (filler), plasticizer, impact modifier, lubricant, antistatic agent, and combinations thereof.

In another embodiment, the thermoplastic resin composition of present invention comprises polyphenylene sulfide resin in which graphite, fluoropolyolefin resin, whiskers and carbon nanotubes are dispersed. The thermoplastic resin composition of present invention can have a surface resistance of about $10^6$ Ω/sq or less according to ASTM D257, a dynamic friction coefficient of about 0.16 or less according to JIS K 7218, an abrasion loss of about 16 mg or less measured after a specimen of 10 cm×10 cm is rubbed with two round shaped aluminum pieces with a 5 cm diameter using a Taber fiction tester during 10,000 cycles at 90 rpm according to ASTM D4060 and a thermal modification temperature of about 245° C. or more at a pressure of 0.45 MPa according to ASTM D648.

The present invention further provides plastic products manufactured from the thermoplastic resin composition.

Non-limiting examples of the plastic products can include precision machine parts and printer bushings.

DETAILED DESCRIPTION OF THE INVENTION

The present invention will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Polyphenylene Sulfide Resin

The polyphenylene sulfide resin (A) used in the present invention can have excellent high heat resistance and can maintain its quality at a low temperature of about −50° C. as well. In addition, it can have excellent dimensional stability and creep resistance over a broad range of temperatures.

The polyphenylene sulfide resin can be nontoxic, safe and flame resistant so that it is not significantly burned and can have relatively low viscosity so that it is considered a suitable resin to make a high-charged resin complex.

In exemplary embodiments, linear polyphenylene sulfide resin containing about 70 mol % or more of the repeating unit represented by the following Chemical Formula 1 may be used.

[Chemical Formula 1]

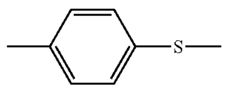

If the polyphenylene sulfide resin includes the repeating unit of Chemical Formula 1 in an amount of about 70 mol % or more, the linear polyphenylene sulfide resin can have high crystallinity, excellent heat resistance, chemical resistance and strength.

In some embodiments, the polyphenylene sulfide resin can include the repeating unit of Chemical Formula 1 in an amount of about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100 mol %. Further, according to some embodiments of the present invention, the amount of the repeating unit of Chemical Formula 1 can be in a range from about any of the foregoing amounts to about any other of the foregoing amounts.

A representative manufacturing process for a linear polyphenylene sulfide resin having the repeating unit of Chemical Formula 1 is disclosed in Japanese Patent Publication Laid-open No. S52-12240, which is incorporated herein by reference in its entirety.

The polyphenylene sulfide resin may also comprise other polyphenylene sulfide resin(s) having a different repeating unit in an amount of about 50 mol % or less, for example about 30 mol % or less, and as another example about 20 mol % or less, compared with the polyphenylene sulfide resin of the above Chemical Formula 1.

In some embodiments, the polyphenylene sulfide resin may not include a repeating unit(s) that is different from that of Chemical Formula 1 (i.e., the polyphenylene sulfide resin may include 0% by weight of a repeating unit(s) that is different from that of Chemical Formula 1). In some embodiments, the repeating unit(s) that is different from that of Chemical Formula 1 may be present in the polyphenylene sulfide resin, i.e., the polyphenylene sulfide resin may include the repeating unit(s) that is different from that of Chemical Formula 1 in an amount of about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mol %. Further, according to some embodiments of the present invention, the amount of the repeating unit(s) that is different from that of Chemical Formula 1 can be in a range from about any of the foregoing amounts to about any other of the foregoing amounts.

Non-limiting examples of the different repeating units can include the following Chemical Formula 2 to 9, as well as combinations thereof.

[Chemical Formula 2]

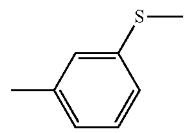

[Chemical Formula 3]

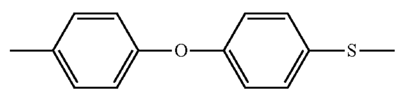

[Chemical Formula 4]

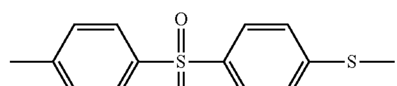

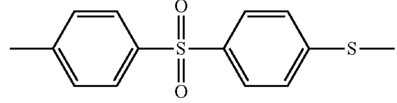

[Chemical Formula 5]

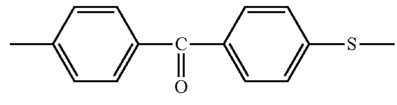

[Chemical Formula 6]

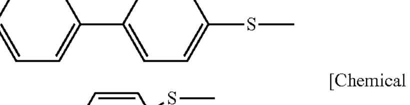

[Chemical Formula 7]

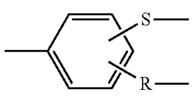

wherein R is $C_1$-$C_{20}$ alkyl, nitro, phenyl, $C_1$-$C_{20}$ alkoxyl, carboxyl or $C_1$ to $C_{20}$ carboxylic acid salt.

[Chemical Formula 8]

[Chemical Formula 9]

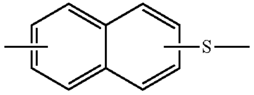

Optionally, a polymeric composition which contains about 50 mol % or more of a copolymer of p-dichlorobenzene and sodium sulfide may be used as the polyphenylene sulfide resin. In some embodiments, the polyphenylene sulfide resin can include a copolymer of p-dichlorobenzene and sodium sulfide in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mol %. Further, according to some embodiments of the present invention, the amount of the copolymer of p-dichlorobenzene and sodium sulfide can be in a range from about any of the foregoing amounts to about any other of the foregoing amounts.

The polyphenylene sulfide resin can have a weight average molecular weight (Mw) of about 3,000 to about 50,000, for example about 5,000 to about 30,000. Such a range of weight average molecular weight can reduce hardening resulting from the reaction of the resins during extrusion or injection molding.

In another exemplary embodiment, the polyphenylene sulfide resin can have a melt index (MI) of about 50 to about 100 g/10 minute at about 316° C. and a weight of 2.16 kg.

In the present invention, the thermoplastic resin composition can include the polyphenylene sulfide resin in an amount of about 50 to about 90% by weight, for example about 55 to about 85% by weight, based on the total weight of the resin composition. In some embodiments, the thermoplastic resin composition can include the polyphenylene sulfide resin in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the polyphenylene sulfide resin can be in a range from about any of the foregoing amounts to about any other of the foregoing amounts.

If the polyphenylene sulfide resin is used in an amount within these ranges, a balance of excellent electrical conductivity, wear resistance and high heat resistance physical properties can be achieved.

(B) Graphite

Graphite is a form of carbon and can have various crystal structures, including hexagonal systems and partially trigonal systems. Carbon atoms are connected to one another to form hexagon shapes, similar to the shape of benzene rings, and these hexagon shaped plates form a continuous layered structure. The bonding between these layers, called a gamma bond, is so weak that complete basal cleavage is easily made and the plate is apt to slide. As a consequence of its tendency to slide easily, graphite has a very low frictional coefficient and lubricating capacity so that it is used as a coating agent or lubricant. The plates of graphite easily slide to form glide planes and exhibit anisotrophy because they do not overlap toward the C-axis. The graphite can also be described as thermally expandable graphite.

The resin composition of the present invention can have a combination of excellent wear resistant as well as conductivity by virtue of this peculiar sliding nature of graphite.

In the present invention, natural graphite, synthetic graphite, or a combination thereof, can be used. The synthetic graphite can be graphite manufactured by a graphitizing process of petroleum coke, which is a byproduct of petroleum refining. The petroleum coke can be mixed with coal tar binder and petrolic oil and then the mixture can be injected during heating to form a green bar or green stock. This green bar or green stock can be burned in an Acheson electric stove at a temperature of about 800 to about 1,000° C., so that the pitch binder begins to change into coke. This coke can shrink to form deteriorated coke or deteriorated carbon. This deteriorated coke or carbon can then be mixed with fillers such as coal tar or petroleum pitch because of its many pores and then can be heated in an Acheson electric stove at a temperature of about 2,600 to about 3,000° C., so that the carbon atoms form an array between fillers, and become graphite. This process is called graphitization. This kind of graphite can have relatively high electric resistance and can exhibit isotropy because it is arranged in a single direction with relatively high purity.

In exemplary embodiments, the graphite may be surface-treated using one or more various chemical compounds. Examples of surface-treating agents include without limitation alkaline earth metal compounds such as calcium carbonate, calcium oxide, calcium hydroxide, magnesium carbonate, magnesium oxide, magnesium hydroxide, barium carbonate, barium oxide, barium hydroxide, and the like, silane coupling reagents, titanium coupling reagents, aluminum coupling reagent, and the like, and combinations thereof.

The graphite which can be used to manufacture the resin composition of the present invention can have an average particle size of about 0.5 to about 300 μm, for example about 5 to about 150 μm.

In the present invention, the thermoplastic resin composition can include graphite in an amount of about 5 to about 30% by weight, for example about 7 to about 25% by weight, and as another example about 10 to about 22% by weight, based on the total weight of the resin composition. In some embodiments, the thermoplastic resin composition can include the graphite in an amount of about 5, 6, 7, 8, 9, 10, 11, 12, 13, 14, 15, 16, 17, 18, 19, 20, 21, 22, 23, 24, 25, 26, 27, 28, 29, or 30% by weight. Further, according to some embodiments of the present invention, the amount of the graphite can be in a range from about any of the foregoing amounts to about any other of the foregoing amounts.

If the graphite is used in an amount noted herein, a balance of excellent electrical conductivity, wear resistance and high heat resistance physical properties can be achieved.

(C) Fluoropolyolefin Resin

Examples of the fluoropolyolefin resin used in the present invention include without limitation polytetrafluoroethylene, polyvinylidene fluoride, copolymer of tetrafluoroethylene and vinylidene fluoride, copolymer of tetrafluoroethylene and hexafluoropropylene, copolymer of ethylene and tetrafluoroethylene and the like. These materials may be used singly or together with two or more other materials.

The fluoropolyolefin resin used in the resin composition of the present invention can be synthesized by known polymerization processes. As a non-limiting example, the fluoropolyolefin resin can be synthesized under conditions of about 7 to about 71 kg/cm$^2$ pressure and about 0 to about 200° C., for example about 20 to about 100° C., in a hydro-media containing a free radical forming catalyst such as sodium, potassium or ammonium peroxydisulfate.

Fluoropolyolefin resin may be used in an emulsion state or powder state. If the resin is used in an emulsion state, it can be dispersed well in the entire resin composition but the manufacturing process may become complex. If the fluoropolyolefin resin is used in a powder state, it should be dispersed properly in the entire resin composition and form a fibrous network.

An exemplary fluoropolyolefin resin which can be used in the resin composition of the present invention is polytetrafluoroethylene having an average particle size of about 0.05 to about 1000 μm, for example about 1 to about 300 μm, and as another example about 3 to about 50 μm, and a specific gravity of about 1.2 to about 2.3 g/cm$^3$.

In the present invention, the thermoplastic resin composition can include the fluoropolyolefin resin in an amount of about 5 to about 30% by weight for example about 7 to about 28% by weight, and as another example about 10 to about 27% by weight, based on the total weight of the resin composition. In some embodiments, the thermoplastic resin composition can include the fluoropolyolefin resin in an amount of about 5, 6, 7, 8, 9, 10, 11, 12, 13, 14, 15, 16, 17, 18, 19, 20, 21, 22, 23, 24, 25, 26, 27, 28, 29, or 30% by weight. Further, according to some embodiments of the present invention, the amount of the fluoropolyolefin resin can be in a range from about any of the foregoing amounts to about any other of the foregoing amounts.

Using the fluoropolyolefin resin in the amounts noted herein can achieve a balance of excellent electrical conductivity, wear resistance and high heat resistance physical properties.

(D) Whiskers

The whiskers (D) used in the present invention can be a pin or branch shaped material, and can be used as filler to reinforce the physical properties of the thermoplastic resin, including those resulting from the network formed by using the fluoropolyolefin resin.

Whiskers are known on the art. Examples of the whiskers include without limitation zinc oxide (ZnO) whiskers, calcium carbonate ($CaCO_3$) whiskers, titanium dioxide ($TiO_2$) whiskers, silicon dioxide ($SiO_2$) whiskers, silicon carbide whiskers, aluminum borate whiskers, magnesium borate whiskers, potassium titanate whiskers, silicon nitride whiskers, silicon carbide whiskers, aluminum oxide whiskers, and the like, and combinations thereof.

In exemplary embodiments, the above whiskers may be coated with one or more conductive materials. If a coated whisker is used, the thermoplastic resin can have electrical conductivity. Examples of the conductive materials include without limitation silver, copper, aluminum, iron, palladium, tin oxide, indium oxide, silicon carbide, zirconium carbide, titanium carbide, graphite, and the like. These materials may be used singly or together with two or more other materials.

In exemplary embodiments, the above whiskers may have an average diameter of about 0.15 to about 10 μm and an average length of about 2 to about 100 μm. Using whiskers having a diameter and length within these ranges can more effectively improve the wear resistance of the polyphenylene sulfide resin.

In the present invention, the thermoplastic resin composition can include the whiskers in an amount of about 1 to about 10% by weight, for example about 1.5 to about 7% by weight, and as another example about 2 to about 5.5% by weight, based on the total weight of the resin composition. In some embodiments, the thermoplastic resin composition can include the whiskers in an amount of about 1, 2, 3, 4, 5, 6, 7, 8, 9, or 10% by weight. Further, according to some embodiments of the present invention, the amount of the whiskers can be in a range from about any of the foregoing amounts to about any other of the foregoing amounts.

If the whiskers are used in an amount noted herein, a balance of excellent electrical conductivity, wear resistance and high heat resistance physical properties can be achieved.

(E) Carbon Nanotubes

The carbon nanotubes used in the present invention can give the thermoplastic resin high electrical conductivity. Carbon nanotubes are generally materials with special qualities such as high mechanical strength, initial modulus of elasticity (Young's modulus), and aspect ratio, among other properties. Carbon nanotubes can also retain high electrical conductivity and high heat resistance, and thus can impart excellent electrical conductivity and mechanical and thermal characteristics to a thermoplastic resin when the carbon nanotubes are mixed into the resin.

The carbon nanotubes can be synthesized by various methods as known on the art, such as arc-discharge method, pyrolysis, laser ablation, plasma enhanced chemical vapor deposition, thermal chemical vapor deposition, electrolytic method and the like. The carbon nanotubes used in the present invention, however, are not limited to those produced using these synthetic methods.

Carbon nanotubes can be classified as single-walled carbon nanotubes, double-walled carbon nanotubes and multi-walled carbon nanotubes depending on the numbers of walls. Any kind of carbon nanotube as well as mixtures thereof can be used in the present invention.

There is no specific limitation to the size of the carbon nanotubes. In exemplary embodiments, the carbon nanotubes can have an average external diameter of about 0.5 to about 100 nm, for example about 1 to about 50 nm, as another example about 5 to about 20 nm, and an average length of 0.01 to about 100 μm, for example about 0.01 to about 20 μm, and as another example about 0.5 to about 10 μm. If a carbon nanotube having an external diameter and length within the above ranges is used, excellent electrical conductivity and processability can be achieved.

The carbon nanotubes can have a high aspect ratio (L/D) value because of the above average external diameter and average length sizes. In exemplary embodiments, the carbon nanotubes can have a L/D value of about 100 to about 1000, which can increase the electrical conductivity of the resin.

In the present invention, the thermoplastic resin composition can include the carbon nanotubes in an amount of about 0.01 to about 10% by weight, for example about 0.1 to about 5% by weight, based on the total weight of the resin composition. In some embodiments, the thermoplastic resin composition can include the carbon nanotubes in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10% by weight. Further, according to some embodiments of the present invention, the amount of the carbon nanotubes can be in a range from about any of the foregoing amounts to about any other of the foregoing amounts.

If the carbon nanotubes are used in an amount noted herein, excellent electrical conductivity and dispersibility can be achieved without degenerating the original physical properties of the resin. The thermoplastic resin composition of the present invention can have a structure in which graphite, fluoropolyolefin resin, whiskers and carbon nanotubes are dispersed in a polyphenylene sulfide resin. The resin composition can have a surface resistance of about $10^6$ Ω/sq or less, for example about $10^5$ Ω/sq or less, and as another example about $10^2$ to about $10^5$ Ω/sq measured according to ASTM D257. The resin composition also can have a dynamic friction coefficient of about 0.16 or less, for example about 0.05 to about 0.15, measured according to JIS K 7218. Also, the resin composition can have an abrasion loss of about 16 mg or less, for example about 0.1 to about 15.5 mg, measured after the steps of preparing a specimen having a size of 10 cm×10 cm of the resin composition; and rubbing the specimen with two round shaped aluminum-pieces with a 5 cm diameter using a Taber fiction tester during 10,000 cycles at 90 rpm according to ASTM D4060. The resin composition also can have a thermal modification temperature of about 245° C. or more, for example about 247 to about 300° C., at a pressure of 0.45 MPa measured according to ASTM D648.

In exemplary embodiments, the resin composition can have a surface resistance of about $10^1$ to about $10^6$ Ω/sq measured according to ASTM D257, a dynamic friction coefficient of about 0.05 to about 0.16 measured according to JIS K 7218 and an abrasion loss of about 1 to about 16 mg measured after the steps of preparing a specimen having a size of 10 cm×10 cm of the resin composition; and rubbing the specimen with two round shaped aluminum-pieces with a 5 cm diameter using a Taber fiction tester during 10,000 cycles at 90 rpm according to ASTM D4060, and a thermal modification temperature of about 245 to about 280° C. at a pressure of 0.45 MPa measured according to ASTM D648.

In addition to each constituent described above, the thermoplastic resin composition of the present invention may also comprise one or more additives depending on the desired properties and purpose of the composition. Examples of the additives include without limitation include flame retardants, antimicrobial agents, mold release agents, heat stabilizers, antioxidant agents, light stabilizers, compatibilizing agents, dyes, pigments, coupling agents, charging materials (fillers), plasticizers, impact modifiers, lubricants, antistatic agents, and the like. These additives can be used singly or together with two or more other kinds of the additives.

The thermoplastic resin composition can include the additive(s) in an amount of about 0 to about 60 parts by weight, for example about 0.1 to about 30 parts by weight, based on 100 parts by weight of the total resin composition. In some embodiments, the thermoplastic resin composition may not include an additive(s) (i.e., the thermoplastic resin composition may include 0 parts by weight of an additive(s)). In some embodiments, the additive(s) may be present in the thermoplastic resin composition, i.e., the thermoplastic resin composition may include the additive(s) in an amount of about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 parts by weight. Further, according to some embodiments of the present invention, the amount of the additive(s) can be in a range from about any of the foregoing amounts to about any other of the foregoing amounts.

The transparent thermoplastic resin of the above composition can have excellent electrical conductivity, wear resistance and high heat resistance so that it can be used to manufacture various kinds of plastic products like precision machine parts, components of electric and electronic goods, automobile precision parts, and cables, among others and can be especially suitable for use for printer bushings.

The resin composition of the present invention can be prepared using known processes. For example, it can be prepared in pellet form by mixing all the components of the composition of the present invention sand melting and extruding the composition in an extruding machine. Alternatively, the composition can be extruded to form the desired product. The above synthesized pellets (or composition when directly extruded to form the desired product) may be manufactured into various plastic products using known molding processes such as but not limited to injection molding, extrusion molding, vacuum forming, casting processes and the like.

The invention may be better understood by reference to the following examples which are intended to illustrate the present invention and do not limit the scope of the present invention, which is defined in the claims appended hereto.

EXAMPLES

The items used in the following examples and comparative examples are given below.

(A) Polyphenylene Sulfide Resin

Polyphenylene sulfide resin FZ-2100 manufactured by DIC Ltd. of Japan is used.

(B) Graphite

A synthetic graphite KS 5-75TT with an average particle size of 5 to 75 μm manufactured by TIMCAL Ltd. is used.

(C) Fluoropolyolefin Resin

A fluoropolyolefin resin available as Teflon 7AJ manufactured by Dupont Ltd. of U.S.A. is used.

(D) Whiskers

Whiskers available as Whiscal A, a calcium carbonate whisker with an average diameter of 0.5 to 1 μm and an average length of 20 to 30 μm manufactured by Maruo Calcium Ltd., is used.

(E) Carbon Nanotubes

Carbon nanotubes available as NC-7000, which are multiwalled carbon nanotubes with an average external diameter of 5 to 30 nm and an average length of 1 to 25 μm manufactured by Nanocyl Ltd., are used.

Examples 1 to 5 and Comparative Examples 1 to 5

The components as shown in Table 1 and 2 are mixed to form each thermoplastic resin composition, and then each thermoplastic resin composition is extruded through a conventional twin screw extruder (L/D=35, ϕ=45 mm) into pellets. The respective resin pellets are molded into a test specimen using a 10 oz injection molding machine at 280° C. to measure the electrical conductivity and various physical properties. After exposure at 23° C. and 50% of relative humidity for 48 hours, the physical properties of the test specimens are measured as follows and the results are shown in Tables 1 and 2 below.

The Methods of Measuring Physical Properties

1) Surface resistance (Ω/sq): The surface resistance of each specimen is measured according to ASTM D257 using SRM-100 of Wolfgang Warmbier Ltd.

2) Wear resistance

① Dynamic friction coefficient: The dynamic friction coefficient of each specimen is measured according to JIS K 7218.

② Abrasion loses: According to ASTM D4060, a specimen of 10 cm×10 cm and two aluminum-pieces with a round shape and a 5 cm diameter are prepared and then the abrasion losses are measured after chafing during 10,000 cycles at 90 rpm using a Taber fiction tester.

3) Heat modification temperature (° C.): The heat modification temperature is measured at a pressure of 0.45 MPa according to ASTM D648.

TABLE 1

| | | Examples | | | | |
|---|---|---|---|---|---|---|
| | | 1 | 2 | 3 | 4 | 5 |
| Contents | (A) Polyphenylene sulfide resin | 70 | 60 | 60 | 68 | 68 |
| | (B) Graphite | 10 | 20 | 10 | 10 | 10 |
| | (C) Fluoropolyolefin resin | 15 | 15 | 25 | 15 | 15 |
| | (D) Whisker | 3 | 3 | 3 | 5 | 3 |
| | (E) Carbon nanotube | 2 | 2 | 2 | 2 | 4 |
| Phys- | Surface resistance (Ω/sq) | $10^5$ | $10^4$ | $10^5$ | $10^5$ | $10^4$ |

TABLE 1-continued

| | | | Examples | | | | |
|---|---|---|---|---|---|---|---|
| | | | 1 | 2 | 3 | 4 | 5 |
| ical prop-erties | Wear resistance | Dynamic friction coefficient | 0.15 | 0.13 | 0.10 | 0.15 | 0.15 |
| | | Abrasion loses (mg) | 15.3 | 12.5 | 11.8 | 15.1 | 15.2 |
| | Heat modification temperature (° C.) | | 250 | 260 | 252 | 255 | 255 |

TABLE 2

| | | | Comparative Examples | | | | |
|---|---|---|---|---|---|---|---|
| | | | 1 | 2 | 3 | 4 | 5 |
| Con-tents | (A) Polyphenylene sulfide resin | | 100 | 80 | 85 | 73 | 72 |
| | (B) Graphite | | — | — | 10 | 10 | 10 |
| | (C) Fluoropolyolefin resin | | — | 15 | — | 15 | 15 |
| | (D) Whisker | | — | 3 | 3 | — | 3 |
| | (E) Carbon nanotube | | — | 2 | 2 | 2 | — |
| Phys-ical prop-erties | Surface resistance (Ω/sq) | | $10^{15}$ | $10^{9}$ | $10^{6}$ | $10^{6}$ | $10^{12}$ |
| | Wear resistance | Dynamic friction coefficient | 0.24 | 0.20 | 0.22 | 0.18 | 0.15 |
| | | Abrasion loses (mg) | 30.0 | 21.1 | 25.5 | 19.2 | 15.2 |
| | Heat modification temperature (° C.) | | 180 | 190 | 220 | 210 | 220 |

As shown in Tables 1 and 2, Examples 1-5 exhibit significantly improved electrical conductivity, wear resistance and heat resistance compared with Comparative Example 1, which includes only polyphenylene sulfide resin. Comparative Example 2, which does not include graphite, exhibits significant deterioration of electrical conductivity, wear resistance and heat resistance compared with Example 2, and Comparative Example 3, which does not include fluoropolyolefin resin, exhibits significant degeneration of electrical conductivity, wear resistance and heat resistance compared with Example 3. Comparative Example 4, which does not include whiskers, exhibits inferior wear resistance and heat resistance compared with Example 4, and Comparative Example 5, which does not include carbon nanotubes, also exhibits low heat resistance as well as definite deterioration of electrical conductivity. Thus, all of the components of graphite, fluoropolyolefin resin, whiskers and carbon nanotubes added to the polyphenylene sulfide resin can provide a composition with a good balance of physical properties such as electrical conductivity, wear resistance and heat resistance.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition having electrical conductivity, wear resistance and high heat resistance, comprising:

(A) about 50 to about 90% by weight polyphenylene sulfide resin; and (B) about 5 to about 30% by weight graphite; and (C) about 5 to about 30% by weight fluoropolyolefin resin; and (D) about 1 to about 10% by weight whiskers; and (E) about 0.01 to about 10% by weight carbon nanotubes.

2. The thermoplastic resin composition of claim 1, wherein the polyphenylene sulfide resin (A) has a weight average molecular weight (Mw) of about 3,000 to about 50,000 g/mol.

3. The thermoplastic resin composition of claim 1, wherein the graphite (B) has an average particle size of about 0.5 to about 300 μm.

4. The thermoplastic resin composition of claim 1, wherein the graphite (B) is surface-treated with an alkaline earth metal compound, silane coupling reagent, titanium coupling reagent, aluminum coupling reagent, or a combination thereof.

5. The thermoplastic resin composition of claim 1, wherein the fluoropolyolefin resin (C) has an average particle size of about 3 to about 50 μm and a specific gravity of about 1.2 to about 2.3 g/cm$^3$.

6. The thermoplastic resin composition of claim 1, wherein the whiskers (D) have an average diameter of about 0.15 to about 10 μm and an average length of about 2 to about 100 μm.

7. The thermoplastic resin composition of claim 1, wherein the whiskers (D) comprise zinc oxide whiskers, calcium carbonate whiskers, titanium dioxide whiskers, silicon dioxide whiskers, silicon carbide whiskers, aluminum borate whiskers, magnesium borate whiskers, potassium titanate whiskers, silicon nitride whiskers, silicon carbide whiskers, aluminum oxide whiskers, or a combination thereof.

8. The thermoplastic resin composition of claim 1, wherein the whiskers (D) include calcium carbonate ($CaCO_3$) whiskers.

9. The thermoplastic resin composition of claim 1, wherein the whiskers (D) are coated with a conductive material.

10. The thermoplastic resin composition of claim 9, wherein the conductive material comprises silver, copper, aluminum, iron, palladium, tin oxide, indium oxide, silicon carbide, zirconium carbide, titanium carbide, graphite, or a combination thereof.

11. The thermoplastic resin composition of claim 1, wherein the carbon nanotubes (E) comprise single-walled carbon nanotubes, double-walled carbon nanotubes, multi-walled carbon nanotubes or a combination thereof.

12. The thermoplastic resin composition of claim 1, wherein said carbon nanotubes (E) have an average external diameter of about 0.5 to about 100 nm and an average length of about 0.01 to about 100 μm.

13. The thermoplastic resin composition of claim 1, further comprising an additive comprising a flame retardant, antimicrobial agent, mold release agent, heat stabilizer, antioxidant agent, light stabilizer, compatibilizing agent, dye, pigment, coupling agent, charging material, plasticizer, impact modifier, lubricant, antistatic agent, or a combination thereof.

14. A plastic product manufactured from the thermoplastic resin composition of claim 1.

15. The plastic product of claim 14, wherein the plastic product is a printer bushing.

16. A thermoplastic resin composition comprising polyphenylene sulfide resin in which graphite, fluoropolyolefin resin, whiskers and carbon nanotubes are dispersed, and having a surface resistance of about $10^6$ Ω/sq or less measured according to ASTM D257, a dynamic friction coefficient of about 0.16 or less measured according to JIS K 7218, an abrasion loss of about 16 mg or less measured after the steps of preparing a specimen of 10 cm×10 cm of the resin composition; and rubbing the specimen with two round shaped aluminum-pieces with a 5 cm diameter using a Taber fiction tester during 10,000 cycles at 90 rpm according to ASTM D4060 and a thermal modification temperature of about 245° C. or more at a pressure of 0.45 MPa measured according to ASTM D648.

* * * * *